US009169127B2

(12) United States Patent
Kahn et al.

(10) Patent No.: US 9,169,127 B2
(45) Date of Patent: Oct. 27, 2015

(54) METHOD FOR PREPARING AN ORGANIC-COMPATIBLE AND WATER-COMPATIBLE COMPOSITION OF METAL NANOCRYSTALS, AND RESULTING COMPOSITION

(75) Inventors: Myrtil Kahn, Toulouse (FR); Fabienne Gauffre-Guirardel, Ramonville Saint-Agne (FR); Javier Rubio-Garcia, Piedras Blancas-Asturias (ES); Christophe Mingotaud, Toulouse (FR); Bruno Chaudret, Vigoulet-Auzil (FR); Sarmenio Saliba, Attard (MT)

(73) Assignee: CENTRE NATIONAL DE LA RECHERCHE SCIENTIFIQUE (C.N.R.S.), Paris (FR)

( * ) Notice: Subject to any disclaimer, the term of this patent is extended or adjusted under 35 U.S.C. 154(b) by 806 days.

(21) Appl. No.: 13/376,261

(22) PCT Filed: Jun. 4, 2010

(86) PCT No.: PCT/FR2010/051106
§ 371 (c)(1),
(2), (4) Date: Feb. 15, 2012

(87) PCT Pub. No.: WO2010/139911
PCT Pub. Date: Dec. 9, 2010

(65) Prior Publication Data
US 2012/0135052 A1 May 31, 2012

(30) Foreign Application Priority Data
Jun. 5, 2009 (FR) ...................................... 09 02738

(51) Int. Cl.
| C01G 1/02 | (2006.01) |
| C08K 13/04 | (2006.01) |
| C08K 13/02 | (2006.01) |
| C08L 71/02 | (2006.01) |
| C08K 3/22 | (2006.01) |
| C01G 25/02 | (2006.01) |
| C01G 23/04 | (2006.01) |
| C01G 29/00 | (2006.01) |
| C01G 9/02 | (2006.01) |
| C01G 51/04 | (2006.01) |
| C01G 11/00 | (2006.01) |
| C01G 27/02 | (2006.01) |
| C01G 17/02 | (2006.01) |
| C01G 49/02 | (2006.01) |
| B01J 13/00 | (2006.01) |
| B22F 1/00 | (2006.01) |
| B22F 9/26 | (2006.01) |
| B82Y 30/00 | (2011.01) |
| C22C 5/04 | (2006.01) |

(52) U.S. Cl.
CPC ............... *C01G 1/02* (2013.01); *B01J 13/0043* (2013.01); *B01J 13/0047* (2013.01); *B22F 1/0018* (2013.01); *B22F 1/0025* (2013.01); *B22F 9/26* (2013.01); *B82Y 30/00* (2013.01); *C01G 9/02* (2013.01); *C01G 11/00* (2013.01); *C01G 17/02* (2013.01); *C01G 23/04* (2013.01); *C01G 25/02* (2013.01); *C01G 27/02* (2013.01); *C01G 29/00* (2013.01); *C01G 49/02* (2013.01); *C01G 51/04* (2013.01); *C08K 3/22* (2013.01); *C08K 13/02* (2013.01); *C08K 13/04* (2013.01); *C08L 71/02* (2013.01); *C22C 5/04* (2013.01); *B22F 2998/00* (2013.01); *C01P 2002/84* (2013.01); *C01P 2004/04* (2013.01); *C01P 2004/32* (2013.01); *C01P 2004/39* (2013.01); *C01P 2004/64* (2013.01); *C01P 2006/60* (2013.01); *Y10T 428/2982* (2015.01)

(58) Field of Classification Search
CPC ............ C01G 1/02; B82Y 30/00; C08K 3/22; C08K 13/02; C08K 13/04
USPC .............. 516/77, 88, 100; 977/773, 774, 775, 977/777, 811
See application file for complete search history.

(56) References Cited

U.S. PATENT DOCUMENTS

| 2008/0072706 A1 | 3/2008 | Lee et al. |
| 2008/0134836 A1 | 6/2008 | Brooks et al. |
| 2008/0157029 A1 | 7/2008 | Lee et al. |

FOREIGN PATENT DOCUMENTS

| EP | 1 623 781 | 2/2006 |
| FR | 2 901 715 | 12/2007 |
| WO | 2009/044389 | 4/2009 |

OTHER PUBLICATIONS

International Search Report dated Oct. 28, 2010, corresponding to PCT/FR2010/051106.
Juliane Keilitz; "Dendritic Polymers with a Core-Multishell Architecture: A Versatile Tool for the Stabilization of Nanoparticles"; Chemistry of Materials; vol. 20, No. 7; Jul. 3, 2008.

*Primary Examiner* — Robert Jones, Jr.
(74) *Attorney, Agent, or Firm* — Young & Thompson

(57) ABSTRACT

A method for preparing a composition of metal nanocrystals from at least one organometallic precursor in a solvent medium in the presence of a PEG ligand, including a carbon chain, at least one end of which is functionalized by a coordination grouping including at least one hetero atom, and having at least one $[OCH_2CH_2]_n$ grouping, n being an integer higher than 1, so as to be soluble both in the solvent medium and in water. The water-compatible and organic-compatible composition of metal nanocrystals thus obtained is also described.

18 Claims, 9 Drawing Sheets

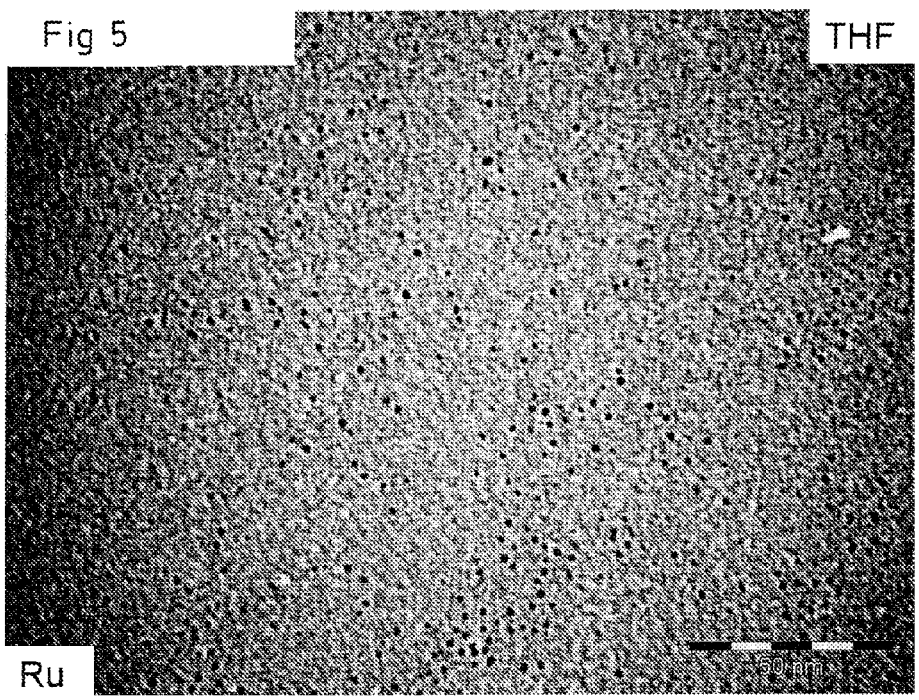
Fig 5 — Ru / THF
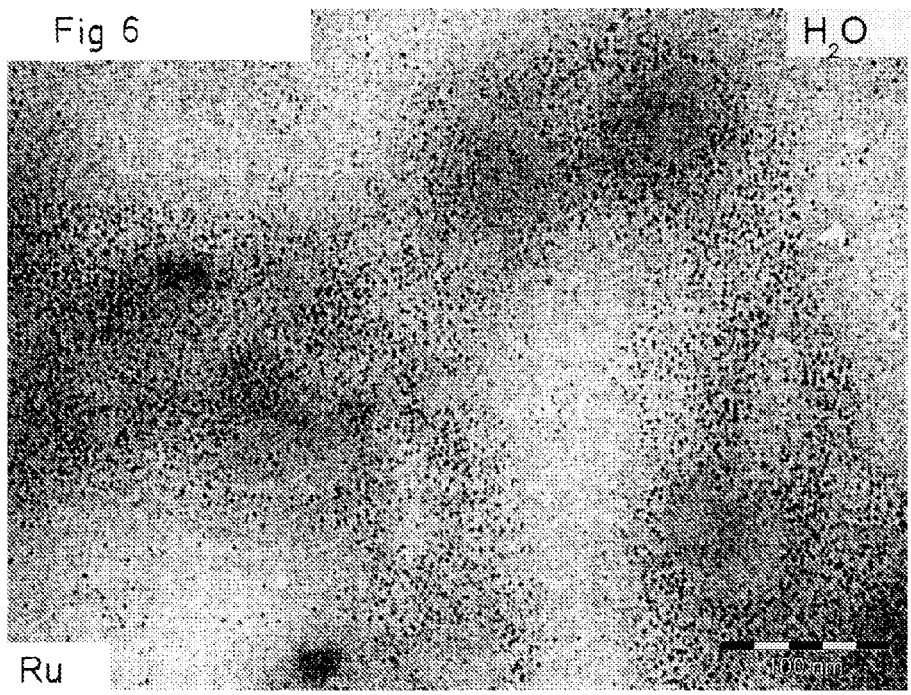
Fig 6 — Ru / H₂O

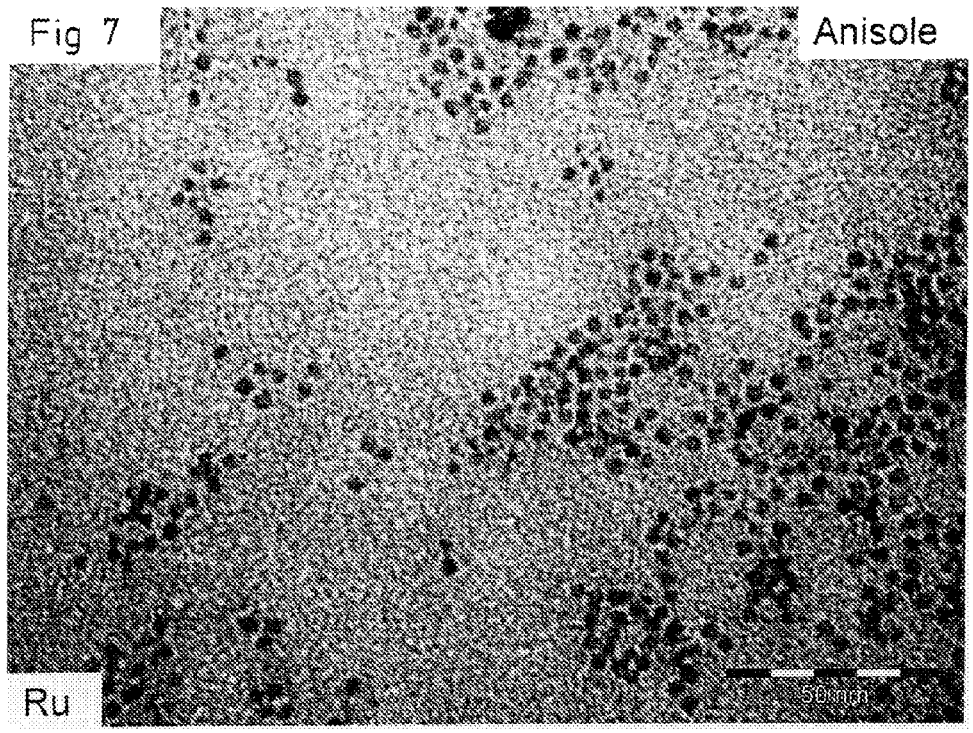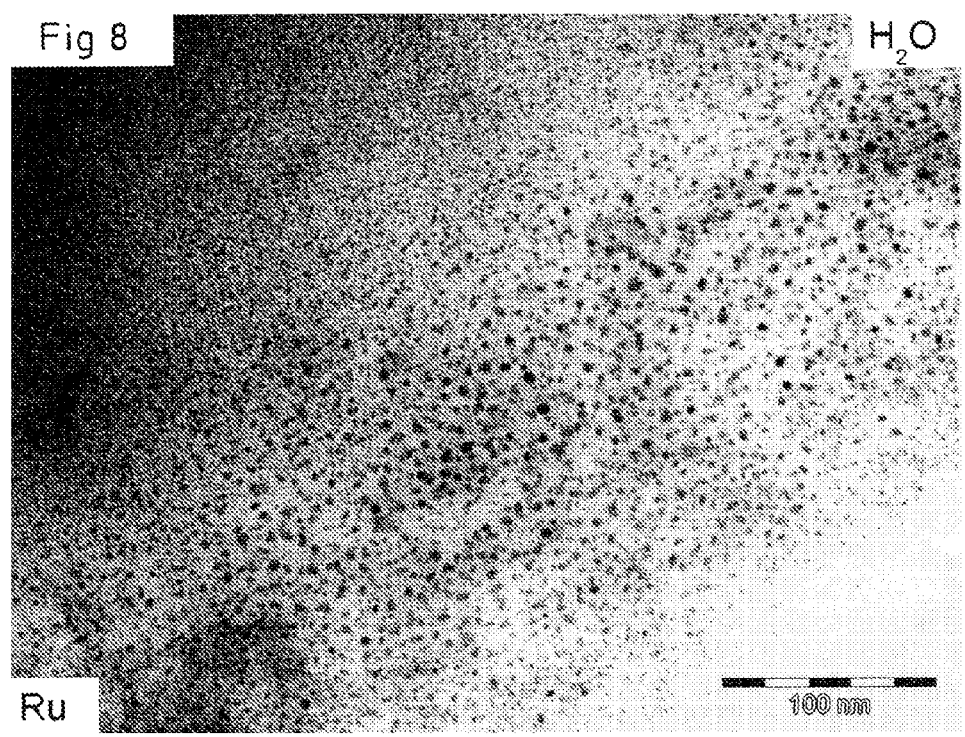

METHOD FOR PREPARING AN ORGANIC-COMPATIBLE AND WATER-COMPATIBLE COMPOSITION OF METAL NANOCRYSTALS, AND RESULTING COMPOSITION

FIELD OF THE INVENTION

The invention relates to a method for preparing a composition of nanoparticles, called metal nanocrystals, of at least one crystalline metal compound from at least one organometallic precursor in a solvent medium and in the presence of at least one ligand chosen from the group of organic compounds which have at least one carbon chain and are soluble in said solvent medium. It also relates to a composition of metal nanocrystals thus obtained.

BACKGROUND OF THE INVENTION

Throughout the text, the following terminology is adopted:
nanoparticle: any particle of whatever shape having at least a width and thickness which are both less than 100 nm, typically of between 1 nm and 20 nm;
metal: including at least one metal atom, in particular which can be chosen from: gold, silver, platinum, rhodium, iron, cobalt, copper, nickel, zinc, tin, titanium, manganese, chromium, vanadium, indium, ruthenium, palladium, molybdenum, niobium, zirconium, tantalum, aluminum, gallium, tungsten, rhenium, osmium, iridium;
non-oxidized metal nanocrystals: nanoparticles made up of at least one pure metal compound in the non-oxidized crystalline state, each nanoparticle having the metal structure, that is to say being formed from atoms of metal(s) bonded to one another as in a bulk metal;
oxidized metal nanocrystals: nanoparticles made up of at least one pure metal compound in the crystalline state, but these nanoparticles having been subjected to an at least partial oxidation after their formation, from an initial state in the form of non-oxidized metal nanocrystals;
metal nanocrystals: non-oxidized metal nanocrystals or oxidized metal nanocrystals;
organometallic precursor: any molecule or coordination compound containing at least one organic grouping bonded to at least one metal atom by a carbon atom or a hetero atom, excluding oxygen (chosen in particular from N, P, As, Si, S, Se, Te), of this organic grouping;
carbon chain: any aliphatic chain, saturated or unsaturated, straight or branched, substituted or unsubstituted, which may include hetero atoms;
solvent medium: any composition in which water and dioxygen can be present only in traces and which is capable of forming a liquid solution when brought into contact with at least one compound such as an organometallic precursor; it can be in the initially liquid state or, on the other hand, can pass into the liquid state only after contact with the compound(s) to be solubilized; it can be simple, that is to say formed by a single compound, or on the other hand complex and comprise several compounds; in particular, it can comprise not only one or more compound(s) which act as the solvent agent, but also any other compound which is not consumed by the formation reaction of metal nanocrystals—in particular in a reduction reaction—is substantially neutral with respect to the dissolution of the organometallic precursor(s), and possibly plays a role in the formation reaction of metal nanocrystals—in particular in a reduction reaction;
colloidal solution: any clear liquid composition of solid nanoparticles dispersed in a liquid; a liquid colloidal solution has several but not all of the properties of a true liquid solution, the nanoparticles remaining in the solid state; colloidal suspension or dispersion is also sometimes referred to;
water-compatible composition of nanoparticles: any composition of nanoparticles which can be dispersed at least in an aqueous medium, in particular any composition which can form a colloidal solution (liquid dispersion) in an aqueous medium;
organic-compatible composition of nanoparticles: any composition of nanoparticles which can be dispersed in at least an organic—in particular non-aqueous—protic or aprotic medium, in particular any composition which can form a colloidal solution (liquid dispersion) with at least such an organic—in particular non-aqueous—protic or aprotic liquid medium;
coordination grouping: any chemical grouping which can form a covalent, dative, hydrogen or electrostatic bond with metal atoms, metal ions, oxygen and metal oxides.

FR 2678855 describes a method for the preparation of a dispersion of metal particles consisting of dissolving an organometallic precursor and a cellulose matrix in a common organic solvent and allowing a reducing agent to act on the solution in order to decompose the precursor into metal particles. This method is satisfactory and enables production of compositions of metal particles which are organic-compatible but which on the other hand are not water-compatible, that is to say cannot be dispersed in an aqueous solvent. It thus does not enable a water-compatible composition of metal nanocrystals to be obtained.

In this respect it is to be noted that the presence of an uncontrolled amount of water is strictly incompatible with a controlled reaction in the presence of organometallic(s). In fact, in the organometallic technical field, water is systematically considered to be detrimental, and indeed a hazard. More particularly, in the case of a reduction reaction starting from an organometallic precursor, it is considered that the presence of an uncontrolled amount of water in the medium would necessarily have the consequence at the very least of considerably disturbing and even preventing the functioning of the reaction. In fact, it is known that any uncontrolled presence of water unavoidably leads to the formation of metal hydroxides (destructive and exothermic decompositions of the Zerewitinoff type) and is destructive and detrimental in the context of the preparation and use of organometallic compounds. Needless to say, reactions in the presence of organometallics are most often carried out in the presence of a water trap in order to work in a dry atmosphere.

It would therefore be useful to enable such compositions of metal nanocrystals which are water-compatible, and more particularly both organic-compatible and water-compatible, that is to say which can be dispersed both, and as required, in aprotic—in particular organic non-aqueous—media and in protic media—in particular water and aqueous media—to be obtained. In particular it is important to obtain such water-compatible compositions to enable them to be used in numerous applications, in particular in physiological media, for therapeutic use or for medical imaging, and in all applications for which the aim is to avoid the use of organic solvents which are toxic and/or polluting volatile organic compounds (VOC), the use of which must be limited and even suppressed taking account of environmental awareness regulations.

In addition, the preparation of water-compatible non-oxidized metal nanocrystals in a first stage and dispersion thereof in an aqueous medium in a second stage could enable, in the case of certain oxidizable metals, nanocrystals of very small dimensions to be obtained in the at least partially oxidized state.

It has already been proposed to prepare colloidal solutions of metal particles in an aqueous medium by means of a reducing agent dissolved in the medium (ascorbate, citrate . . . ) at the reflux temperature in the presence or absence of a stabilizer. Such a method does not enable an organic-compatible composition to be obtained, is accompanied by the formation of contaminating secondary products, and does not enable nanometric particles having at least one dimension smaller than 5 nm to be obtained.

Various methods have also already been proposed to enable compositions of metal nanocrystals which are initially not water-compatible to be rendered water-compatible.

A first approach could consist of exchanging the hydrophobic ligands for ligands which are analogous but have hydrophilic groups, such as polymers derived from PEG (thiol-PEG, amino-PEG, carboxy-PEG). However, this approach would necessitate a relatively complex second stage, the yield of which is not very good. In addition, it would not result in nanocrystals doped exclusively with hydrophilic ligands, the exchange reaction never being total.

A second approach consists of incorporating into the composition obtained amphiphilic ligands which are capable of interacting with the hydrophobic ligands resulting from the preparation of the nanoparticles, without replacing these hydrophobic ligands, forming bilayer structures around the nanoparticles. The compositions obtained with this approach may have a certain toxicity (due to release of amphiphilic compounds) and a poorly controlled stability, which is a disadvantage in particular in biological and therapeutic applications.

In certain very specific cases, another approach can consist of choosing a ligand having at one of the ends of the aliphatic alkyl chain a grouping which subsequently enables chemical reactions for grafting of a hydrophilic grouping to be carried out.

But, there again, an additional stage is necessary, and this approach is only possible in very particular cases which are of little use in practice.

In addition, these various approaches also most often have the disadvantage that the compositions of nanoparticles which have been modified to be water-compatible subsequently are no longer organic-compatible under satisfactory conditions.

The object of the invention is thus to propose a method for preparing a composition of metal nanocrystals which, on the one hand, is both organic-compatible and water-compatible, which to date was considered to be absolutely impossible, and, on the other hand, in which the nanocrystals have at least one dimension—in particular an average dimension—smaller than 5 nm.

More particularly, the object of the invention is to propose a method which enables a composition of metal nanocrystals in the form of a colloidal solution, regardless of the solvent medium, organic or aqueous, and of which the properties remain unchanged in an aqueous medium, to be obtained.

SUMMARY OF THE INVENTION

The object is also to propose such a method which is simple, rapid and easy to control, in particular which can be carried out directly in a single stage by synthesis in a solvent medium, and which can be subjected to easy adjustments to obtain desired characteristics of the nanocrystals, in particular with respect to their shapes and their dimensions. More particularly, the object of the invention is to propose such a method which enables liquid compositions of metal nanocrystals perfectly dispersed (non-agglomerated) in a solvent medium, which can be organic or aqueous, to be obtained, these metal nanocrystals having shapes and dimensions which can be controlled with precision and which are at least substantially uniform, that is to say according to a unimodal distribution, in particular substantially homogeneous (low dispersion), and can even be monodisperse. The object of the invention is also to propose such a method which enables colloidal solutions of metal nanocrystals both in an organic solvent medium and in an aqueous solvent medium to be obtained.

The object of the invention is also to propose such a preparation method which is simple, carried out in a single stage without a complex apparatus, is free from heat treatment, does not produce significant amounts of polluting by-products and is compatible with exploitation on an industrial scale under satisfactory economic conditions.

The object of the invention is also to propose a composition as mentioned above. The object of the invention is thus to propose a novel composition of metal nanocrystals which, on the one hand, is both organic-compatible and water-compatible and, on the other hand, in which the nanocrystals have at least one dimension—in particular an average dimension—smaller than 5 nm.

The object is in particular to propose novel compositions of metal nanocrystals, the chemical (metal content(s)) and dimension characteristics of which it has never been possible to obtain to date.

The object of the invention is also to propose such a method and such a composition which is applicable to a wide variety of metals.

To this extent, the invention relates to a method for the preparation of a composition of metal nanoparticles in the crystalline state, called metal nanocrystals, from at least one organometallic precursor, in which:

a liquid solution of at least one organometallic precursor in a solvent medium in the presence of at least one compound, called organic ligand, which has at least one carbon chain, at least one end of which is functionalized by a coordination grouping including at least one hetero atom, and is soluble in said solvent medium is prepared, at least one reducing agent with regard to each organometallic precursor is allowed to act on this liquid solution under reaction conditions suitable for directly causing the formation of metal nanocrystals, wherein the following are chosen:

at least one ligand, called PEG ligand, from the group of organic ligands which are soluble in water and include at least one carbon chain which has at least one (linear) polyoxyethylene grouping $[OCH_2CH_2]_n$, n being an integer higher than 1, and at least one end of which is functionalized by a coordination grouping chosen from a primary amine —$R^3NH_2$, a carboxyl grouping —$R^4COOH$, a thiol grouping —$R^5SH$, a phosphine grouping —$R^6P(Ph)_2$, Ph representing phenyl, a phosphonate grouping chosen from —$PO(OR^7)(OR^8)$, —$PO(O^-)_2$ and —$PO(O^-)(OH)$; $R^3$, $R^4$, $R^5$, $R^6$ representing a grouping including at least one aliphatic chain, $R^7$ and $R^8$ being chosen from a hydrogen atom and a grouping including at least one aliphatic chain;

said solvent medium such that each PEG ligand is soluble in this solvent medium, and such that a water-compatible and organic-compatible composition of metal nanocrystals is obtained directly in one stage.

The invention thus generally provides a method for preparing metal nanocrystals from at least one organometallic precursor, in which:

a liquid solution of at least one organometallic precursor in a solvent medium in the presence of at least one compound, called organic ligand, which has at least one carbon chain, at least one end of which is functionalized by a coordination grouping including at least one hetero atom, and is soluble in said solvent medium is prepared, this liquid solution is brought into contact with at least one reagent—in particular a reducing agent—under reaction conditions which are suitable for directly causing the formation of metal nanocrystals (in one stage and by decomposition of each organometallic precursor), wherein the following are chosen:

at least one ligand, called PEG ligand, from the group of organic ligands which are soluble in water and include at least one carbon chain which has at least one (linear) polyoxyethylene grouping [—OCH$_2$CH$_2$]$_n$, n being an integer higher than 1, and at least one end of which is functionalized by a coordination grouping chosen from a primary amine —R$^3$NH$_2$, a carboxyl grouping —R$^4$COOH, a thiol grouping —R$^5$SH, a phosphine grouping —R$^6$P(Ph)$_2$, Ph representing phenyl, a phosphonate grouping chosen from —PO(OR$^7$)(OR$^8$), —PO(O$^-$)$_2$ and —PO(O$^-$)(OH); R$^3$, R$^4$, R$^5$, R$^6$ representing a grouping including at least one aliphatic chain, R$^7$ and R$^8$ being chosen from a hydrogen atom and a grouping including at least one aliphatic chain;

said solvent medium such that each PEG ligand is soluble in this solvent medium, and such that a water-compatible and organic-compatible composition of metal nanocrystals—in particular non-oxidized metal nanocrystals—is obtained directly in one stage.

DETAILED DESCRIPTION OF THE INVENTION

Against all expectations, the inventors have found with the greatest surprise that it is in fact possible to prepare a composition of such metal nanocrystals directly by using as the ligand at least one PEG ligand and a solvent which is compatible with each PEG ligand. In fact, such a PEG ligand which is soluble in water is necessarily hydrophilic and, as such, to date was considered as absolutely detrimental with respect to the reaction and the organometallic precursors, in particular due to the fact that a priori it inevitably has the consequence of introduction of water into the reaction medium. However, it is found that this is not the case at all for reasons which to date remain unexplained.

In addition, the inventors have found that this surprising result can be obtained with a wide variety of PEG ligands, and that in reality it is sufficient to replace the hydrocarbon aliphatic alkyl chain of the ligands used in the state of the art to obtain metal nanocrystals by a chain including at least one polyoxyethylene grouping [OCH$_2$CH$_2$]$_n$, n being an integer higher than 1.

This polyoxyethylene grouping of a PEG ligand of a composition of metal nanocrystals obtained by a method according to the invention is an unbranched linear grouping. Preferably, said carbon chain is also an unbranched linear chain. At all events, said carbon chain has a linear main chain incorporating at least one—in particular one and only one—(unbranched linear) polyoxyethylene grouping as mentioned above.

Advantageously, a PEG ligand according to the invention is an organic ligand which contains not only at least one grouping as mentioned above, but also, as a coordination grouping, at least one grouping chosen from carbonyls, nitrogen oxides, amino alcohols, nitriles (in particular cyano), thiols, thiocyanates, isothiocyanates, alkynes, alkenes, arenes (e.g.: cyclopentadiene), carbenes, siloxanes, Lewis acids, such as boranes and aminoboranes, phosphines, phosphine oxides, phosphates, phosphonates, imines (Schiff's bases), diazo compounds, amines, amine oxides, xanthates (R—OC(S)SR'), sulfites, thionyls, thiosulfates, sulfates, cyclodextrins, epoxides, excluding ethylene glycol.

Advantageously and according to the invention, at least one PEG ligand, called amino/carboxy-PEG ligand, is chosen from the group of amines and carboxylic acids which include at least one carbon chain having at least one [OCH$_2$CH$_2$]$_n$ grouping and are soluble in water. Other organic compounds can be used as the PEG ligand (for example thiol-PEG, phosphine-PEG . . . ) according to the uses, and in particular according to each metal compound in question.

The PEG ligands, such as the amines and the carboxylic acids, having at least one grouping derived from oxyethylene, and more particularly at least one polyoxyethylene grouping (the said PEG ligands being derived from ethylene glycol, and more particularly from poly(ethylene glycol) PEG), are soluble in the majority of organic solvents and in water. Such ligands are thus on the one hand soluble both in said solvent medium and in aqueous media, and on the other hand, completely unexpectedly and contrary to all presumptions, in spite of their very hydrophilic and therefore necessarily hydrated, in a significant and uncontrolled proportion, character prove to be compatible with the obtaining of metal nanocrystals under conditions which are virtually identical to those for aliphatic amine and aliphatic carboxylic acid ligands (doped with hydrocarbon aliphatic alkyl chains) traditionally used.

The inventors have thus been able to determine that all the efforts undertaken up till now to replace hydrophobic ligands or to functionalize them or to encapsulate them in surfactants are in reality in vain. In fact, the preparation method can be implemented by direct contact starting from at least one organometallic precursor in liquid solution in a solvent medium with at least one PEG ligand, and in particular an amino/carboxy-PEG ligand, which is capable of being soluble both in said solvent medium and in water and aqueous media.

Advantageously and according to the invention, at least one PEG ligand, called amino/carboxy-PEG ligand, is thus chosen from the group of amines and carboxylic acids which include at least one carbon chain having at least one [OCH$_2$CH$_2$]$_n$ grouping, n being an integral number higher than 1, and are soluble in water. More particularly, advantageously and according to the invention, at least one amino/carboxy-PEG ligand is chosen from α-amino-poly(ethylene glycol), bis-amino-poly(ethylene glycol), α-carboxy-poly(ethylene glycol), bis-carboxy-poly(ethylene glycol) and α-amino-ω-carboxy-poly(ethylene glycol).

Such an amino/carboxy-PEG ligand used in a method according to the invention is a derivative of ethylene glycol or of a PEG, at least one end of which is functionalized by a grouping chosen from a primary amine —RNH$_2$ and a carboxyl grouping —R'COOH, that is to say the general formula (I) of which is the following:

$$R^1[OCH_2CH_2]_nOR^2 \qquad (I)$$

in which:

R$^1$ is chosen from a primary amine —R$^3$NH$_2$, a carboxyl grouping —R$^4$COOH, a thiol grouping —R$^5$SH, a phosphine grouping —$R^6P(Ph)_2$, Ph representing phenyl, a phosphonate grouping chosen from —$PO(OR^7)(OR^8)$, —$PO(O^-)_2$ and —$PO(O^-)(OH)$; $R^3$, $R^4$, $R^5$, $R^6$ representing a grouping including at least one aliphatic chain, $R^7$ and $R^8$ being chosen from a hydrogen atom and a grouping containing at least one aliphatic chain, $R^2$ is chosen from a hydrogen atom, an alkyl grouping, an unbranched fatty chain, a primary amine —$R^3NH_2$, a carboxyl grouping —$R^4COOH$, a thiol grouping —$R^5SH$, a phosphine grouping —$R^6P(Ph)_2$, Ph representing phenyl, a phosphonate grouping chosen from —$PO(OR^7)(OR^8)$, —$PO(O^-)_2$ and —$PO(O^-)(OH)$; $R^3$, $R^4$, $R^5$, $R^6$ representing a grouping including at least one aliphatic chain, $R^7$ and $R^8$ being chosen from a hydrogen atom and a grouping including at least one aliphatic chain, n is an integral number higher than 1.

Furthermore, advantageously and according to the invention, each PEG ligand used has an average molecular weight of between 300 g·mol$^{-1}$ and 20,000 g·mol$^{-1}$—in particular between 750 g·mol$^{-1}$ and 3,000 g·mol$^{-1}$.

For example, advantageously and according to the invention, at least one amino/carboxy-PEG chosen from the group including:

bis(3-propylamine)-poly(ethylene glycol) of the formula $H_2C_3H_6[OCH_2CH_2]_nOC_3H_6NH_2$, having a molecular weight of the order of 1,500 g·mol$^{-1}$, α-(2-ethylamine)-methoxy(ethylene glycol) of the formula $H_3C[OCH_2CH_2]_nOC_2H_4NH_2$, having a molecular weight of the order of 750 g·mol$^{-1}$, poly(ethylene glycol) methyl ether-carboxylic acid of the formula $H_3C[OCH_2CH_2]_n$—$CH_2$—$COOH$, having a molecular weight of the order of 3,000 g·mol$^{-1}$, is used.

Preferably, in a method according to the invention an amount of PEG ligand(s) of between 0.1 and 1 times the amount which is equimolar to that of the metal atoms of the precursor(s) is used.

Advantageously and according to the invention, at least one ligand which is not volatile at the reaction temperature, acting as a dispersing agent for the composition produced in the solvent medium, is chosen. The metal nanocrystals are thus spontaneously in the dispersed (colloidal) state in the final composition.

In a method according to the invention, the reaction conditions are chosen and adapted such that the formation of nanocrystals is obtained. The reaction conditions chosen include in particular:

the choice of the solvent medium;
the choice of the ligand(s);
the initial concentrations;
the reaction temperature;
the reaction pressure;
the choice of the reducing agent.

The method of the invention thus consists of carrying out a direct chemical reaction of reduction and decomposition of at least one organometallic precursor in liquid solution.

Advantageously and according to the invention, at least one base and at least one acid are chosen as PEG ligands. Advantageously and according to the invention, at least one amine, as the base, in particular a primary amine as mentioned above, and at least one carboxylic acid are used.

In a method of the invention, said solvent medium includes at least one solvent which is chosen such as to enable on the one hand dissolution of each organometallic precursor, and on the other hand of each PEG ligand used, and to enable the reduction reaction to proceed to obtain metal nanocrystals which are at least initially non-oxidized. Advantageously and according to the invention, said solvent medium includes a solvent chosen from THF, toluene, anisole and mesitylene (1,3,5-trimethylbenzene).

In a particular embodiment of the invention, the metal nanocrystals obtained are precipitated, for example by addition of pentane to the solvent medium, such that the metal nanocrystals obtained are in the form of a powder at the end of the reaction.

Furthermore, the inventors have found that said solvent medium and its structure enable the size, the shape and the size distribution of the nanocrystals to be controlled.

Moreover, advantageously and according to the invention, the production of the nanocrystals (reduction reaction) is carried out at a temperature of between 0° C. and 300° C.—in particular at ambient temperature. In the majority of cases, the reduction can be carried out at a temperature below 50° C.—in particular at ambient temperature. The method according to the invention is thus of extreme simplicity.

Advantageously and according to the invention, each precursor is chosen such that each residue formed from this precursor is volatile under the reaction conditions. Thus, in a method according to the invention the reduction reaction produces only solid metal nanocrystals and (a) volatile organic residue(s). With a volatile solvent medium, and if the residue(s) of the reduction reaction is(are) volatile, the composition resulting from the reduction reaction is solid. It can be taken up in another solvent medium, including aqueous, and then forms a liquid colloidal solution. There is nothing to prevent, alternatively, choosing a precursor of which the residues of the reaction are not volatile under the reaction conditions.

Taking into account the above, the method according to the invention can be implemented with all the elements for which there exists an organometallic precursor which is spontaneously reactive to the reduction reaction and can be placed in liquid solution in a solvent medium compatible with the solubilization, in a sufficient amount, of at least one PEG ligand.

Among these elements there may be mentioned: gold, silver, platinum, rhodium, iron, cobalt, copper, nickel, zinc, tin, titanium, manganese, chromium, vanadium, indium, ruthenium, palladium, molybdenum, niobium, zirconium, tantalum, aluminum, gallium, tungsten, rhenium, osmium, iridium.

Examples which may be mentioned of organometallic precursors which are spontaneously reactive to the reduction reaction and can be used in a method according to the invention are complex coordination compounds including at least one of the abovementioned elements and at least one grouping chosen from amides, alkyls, aryls, cyclopentadienyls, olefins, polyolefins, alkynes, alkynines, silyls.

Advantageously and according to the invention, at least one reducing agent chosen from dihydrogen and carbon monoxide is used. The reducing agent can be a gas used in the form of agitation or bubbling in the liquid solution or of an atmosphere of said gas under pressure—in particular for example of the order of 3.10$^5$ Pa—above the liquid solution, with agitation of the latter.

The invention enables a water-compatible and organic-compatible composition of metal nanocrystals in the form of a powder or of a colloidal solution and having shapes and dimensions corresponding to a unimodal distribution to be obtained. The metal nanocrystals obtained are initially in the non-oxidized state. If the metal nanocrystals are formed from at least one oxidizable metal and are subsequently brought into contact with an oxidizing agent, such as atmospheric air or an aqueous medium in which they are taken up, the nanocrystals are oxidized at least partially, on the surface or even in the inside. If the metal nanocrystals are formed solely from at least one non-oxidizable metal or if they are left in a non-oxidizing medium, they remain in the non-oxidized state.

With a method according to the invention, it is possible to obtain in a selective, reproducible and quantitative manner perfectly dispersed (non-agglomerated), organic-compatible and water-compatible crystalline metal nanocrystals which have shapes and dimensions which are at least substantially uniform, that is to say according to a unimodal, in particular substantially homogeneous (low dispersion) distribution, and which can even be monodisperse.

Advantageously and according to the invention, each organometallic precursor, the solvent medium and each ligand are chosen such that a water-compatible composition of metal nanocrystals having at least one dimension (width if they are elongated nanoparticles; thickness if they are nanoparticles in the form of flakes; average diameter if they are entirely spherical nanoparticles) of between 1 nm and 5 nm.

The invention also relates to a composition obtained by a method according to the invention. The invention thus relates to a composition of metal nanoparticles in the crystalline state, called metal nanocrystals, which include at least one ligand, called PEG ligand, chosen from the group of organic compounds which are soluble in water and include at least one carbon chain:
including at least one polyoxyethylene grouping $[-OCH_2CH_2]_n$, n being an integer higher than 1,
at least one end of which is functionalized by a coordination grouping chosen from a primary amine $-R^3NH_2$, a carboxyl grouping $-R^4COOH$, a thiol grouping $-R^5SH$, a phosphine grouping $-R^6P(Ph)_2$, Ph representing phenyl, a phosphonate grouping chosen from $-PO(OR^7)(OR^8)$, $-PO(O^-)_2$ and $-PO(O^-)(OH)$; $R^3$, $R^4$, $R^5$, $R^6$ representing a grouping including at least one aliphatic chain, $R^7$ and $R^8$ being chosen from a hydrogen atom and a grouping including at least one aliphatic chain, such that this composition of nanocrystals—in particular of non-oxidized metal nanocrystals—is water-compatible and organic-compatible.

Said polyoxyethylene grouping of a PEG ligand of a composition according to the invention is an unbranched linear grouping. Preferably, said carbon chain is also an unbranched linear chain. At all events, said carbon chain has a linear main chain incorporating at least one polyoxyethylene grouping as mentioned above.

In a composition of the invention, the molecules of the PEG ligand are in direct interaction with the surface of the metal nanocrystals, that is to say are bonded to metal atoms and/or to oxygen atoms (in the case where the nanocrystals are at least partially oxidized). More precisely, at least one coordination grouping on the end of each molecule of the PEG ligand is bonded (by a coordination bond, that is to say in particular excluding a bond by weak interactions of the Van der Waals type, which is not a coordination bond in the context of the invention) to at least one such metal and/or oxygen atom of the metal nanocrystals.

In addition, advantageously, in a composition according to the invention each PEG ligand also conforms to all or some of the characteristics mentioned above with reference to the method according to the invention.

Advantageously, a composition according to the invention is a dispersion of metal nanocrystals in the form of an aqueous colloidal solution.

In a composition according to the invention, the metal nanocrystals include at least one metal in the crystalline state chosen from gold, silver, platinum, rhodium, iron, cobalt, copper, nickel, zinc, tin, titanium, manganese, chromium, vanadium, indium, ruthenium, palladium, molybdenum, niobium, zirconium, tantalum, aluminum, gallium, tungsten, rhenium, osmium, iridium.

Advantageously and according to the invention, the metal nanocrystals have a shape anisotropy (they are not spherical). Advantageously and according to the invention, the metal nanocrystals have an elongated shape with an average width of less than 50 nm and an average length greater than two times the average width. Advantageously and according to the invention, the metal nanocrystals have an average width of between 1 nm and 5 nm and an average length of between 10 nm and 50 nm.

Alternatively, advantageously and according to the invention, the metal nanocrystals have a shape isotropy, that is to say are entirely spherical, and have an average dimension of between 1 nm and 5 nm.

In addition, the metal nanocrystals can include at least one oxidizable metal and can be at least partially oxidized. Alternatively, the metal nanocrystals can include solely at least one oxidizable metal, for example a noble metal. In a composition according to this variant of the invention, the metal nanocrystals are non-oxidized metal nanocrystals. In a composition according to the invention, the metal nanocrystals can be in the form of a single metal, or on the other hand of a plurality of metals. To obtain metal nanocrystals including a plurality of metals, it is sufficient to use a plurality of corresponding organometallic precursors simultaneously in the liquid starting solution.

The invention also relates to a method and a composition which comprise a combination of all or some of the characteristics mentioned above or below.

BRIEF DESCRIPTION OF THE DRAWINGS

FIG. 5 is a transmission electron microscopy view of a colloidal solution obtained in THF, FIG. 6 is a transmission electron microscopy view of a colloidal solution obtained in water, FIG. 7 is a transmission electron microscopy view of a colloidal solution obtained in anisole, FIG. 8 is a transmission electron microscopy view of a colloidal solution obtained in water.

EXAMPLES

Figure 1:
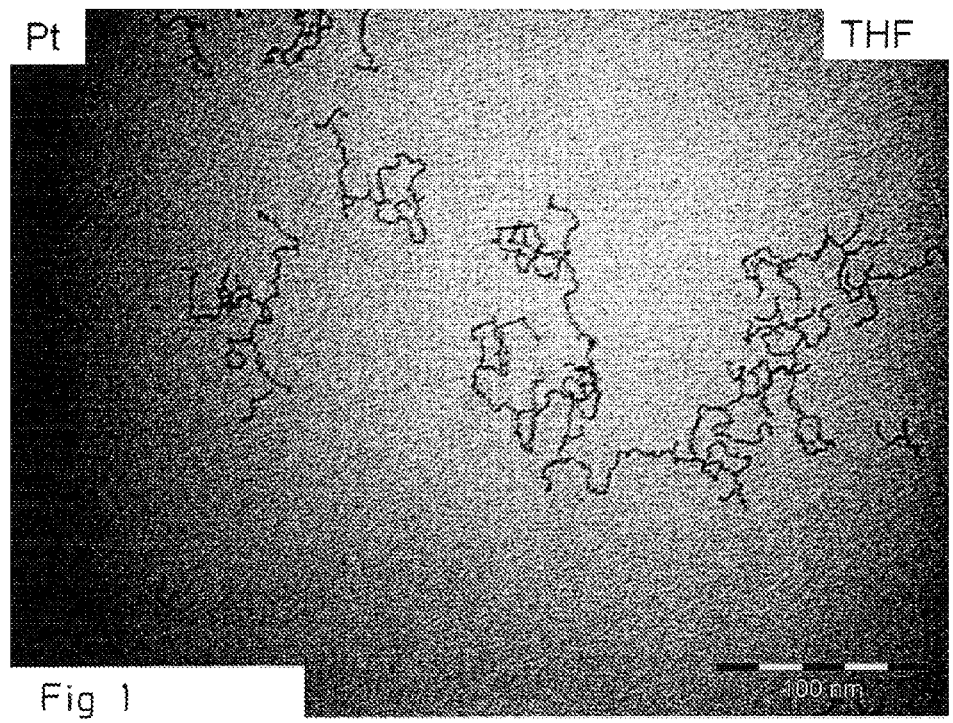
FIG. 1 is a transmission electron microscopy view of a colloidal solution obtained in THF.
Figure 2:
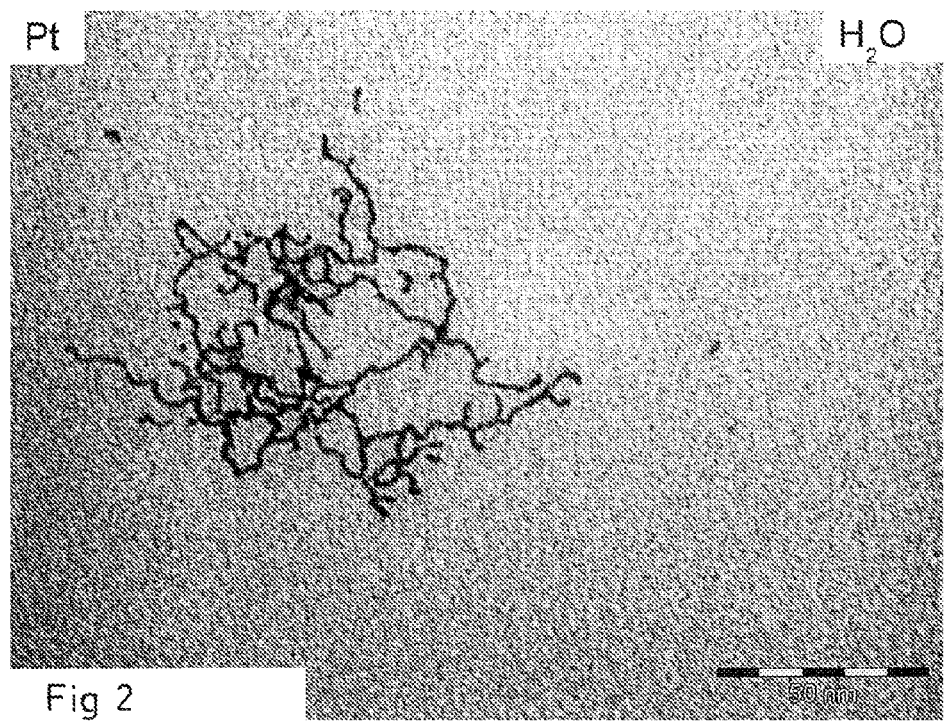
FIG. 2 is a transmission electron microscopy view of a colloidal solution obtained in water.
Figure 3:
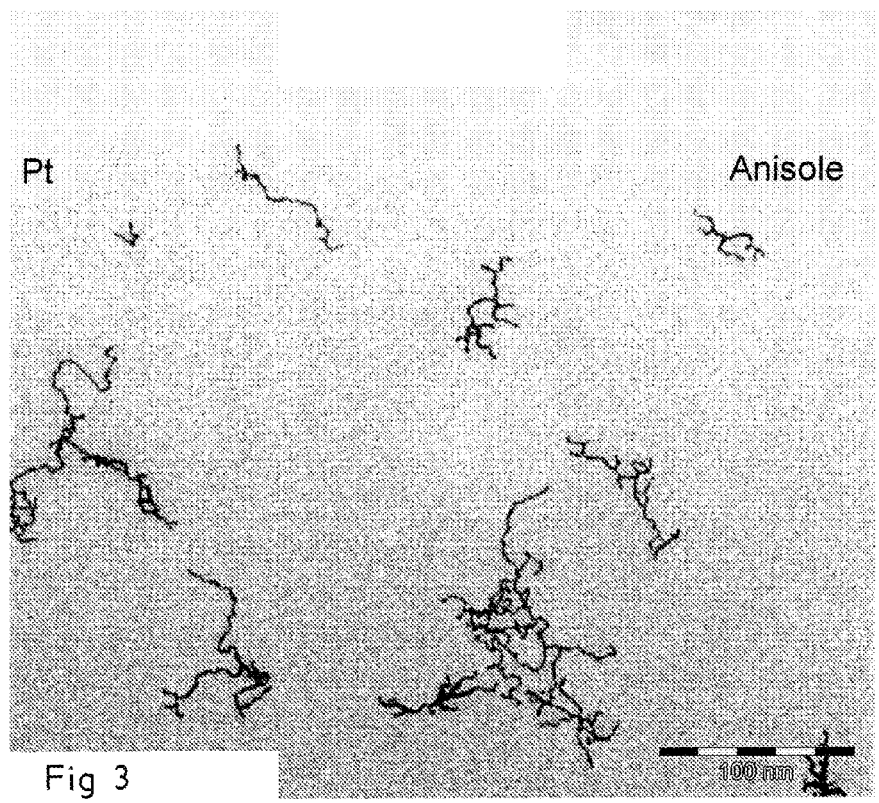
FIG. 3 is a transmission electron microscopy view of a colloidal solution obtained in anisole.
Figure 4:
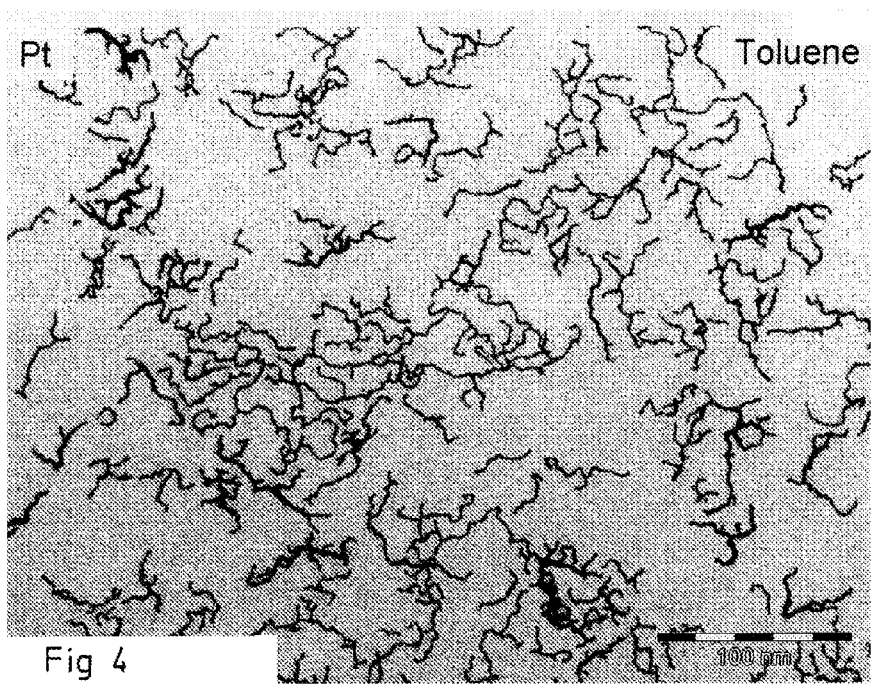
FIG. 4 is a transmission electron microscopy view of colloidal solution obtained in toluene.

General Protocol:

The general experimental protocol used in the examples is that described in FR 2678855, the cellulose matrix being replaced by the ligands according to the invention.

The organometallic precursor(s) is(are) placed in a bottle of the Fisher-Porter type under an argon atmosphere and then cooled to −120° C. with the aid of an ethanol bath cooled with liquid nitrogen. A liquid solution of the PEG ligand(s) in a volume of solvent medium dried (such that a maximum amount of water of the order of 20 ppm (measured by Karl Fisher titration) is present in said aprotic solvent medium) and degassed beforehand is prepared under an argon atmosphere in a Schlenk tube. This solution of ligand(s) is subjected to ultrasound for 30 minutes to obtain a transparent solution. It is then transferred into the bottle of the Fisher-Porter type with the aid of a cannula. The liquid solution is left to stand until each organometallic precursor dissolves and the temperature returns to room temperature. A pressure of $3.10^5$ Pa of dihydrogen is then introduced above the solution for 20 minutes, while the solution is placed under magnetic stirring.

A solution which changes color and takes on the color of the metal under consideration, for example black in the case of platinum and ruthenium, is obtained. The mixture is left to react at a suitable temperature for a duration d, for example from 24 h to 48 h, with stirring continuously under a pressurized hydrogen atmosphere. At the end of this waiting time d, the hydrogen atmosphere is removed and the solution is concentrated with the aid of a vacuum line. A volume V, for example 30 ml, of pentane is added such that the nanocrystals are precipitated in the form of a solid powder having the color of the metal. This solid is washed three times in pentane. The solid metal powder is dried and stored under a controlled atmosphere. It can then be used to form stable colloidal solutions in a large number of different solvents, both in an organic medium and in an aqueous or alcoholic medium. If the solvent medium is oxidizing, and depending on the nature of the metal, the metal nanocrystals may possibly be subjected to an oxidation at least on the surface, the colloidal solution being able to take on the color of the corresponding metal oxide.

In all the examples colloidal solutions could be obtained both in organic solvents and in aqueous media, the color of these corresponding to that of the corresponding metal or oxide. The presence of PEG ligand(s) introduced into the reaction medium was confirmed. The metal nanocrystals form entities which behave like any conventional chemical product and have, for example, a saturation concentration at which a colloidal solution changes into a turbid suspension. This concentration is intrinsic to each system. In the case of colloidal liquid solutions, the electron diffraction of samples deposited on the microscopy grating enables the crystallinity of the nanocrystals to be verified. These microscopy gratings are prepared by depositing a drop of the colloidal liquid solution on the grating. In all the examples, nanocrystals were obtained and liquid colloidal solutions could be obtained both in various organic solvent media and in water. The use of transmission electron microscopy, TEM, also enables the size, the shape and the homogeneity of the nanocrystals formed to be observed.

In all that follows and on the figures, the following abbreviations are used:

BisAmPEG1500: bis(3-propylamine)-poly(ethylene glycol) of the formula $H_2C_3H_6[OCH_2CH_2]_nOC_3H_6NH_2$, having a molecular weight of the order of 1,500 $g \cdot mol^{-1}$, MonoAmPEG750: α-(2-ethylamine)-poly(ethylene glycol) of the formula $H_3C[OCH_2CH_2]_nOC_2H_4NH_2$, having an average molecular weight of the order of 750 $g \cdot mol^{-1}$, MonoAcPEG3000: poly(ethylene glycol) methyl ether-carboxylic acid of the formula $H_3C[OCH_2CH_2]_nO\text{—}CH_2\text{—}COOH$, having a molecular weight of the order of 3,000 $g \cdot mol^{-1}$, Pt(dba)$_2$: platinum bis-dibenzylideneacetone of the formula $Pt[CO(C_6H_5C_2H_2)_2]_2$, Ru(COD)(COT): ruthenium (1,5-cyclooctadiene)(1,3,5-cyclooctatriene) of the formula $Ru(C_8H_{12})(C_8H_{10})$, Pd$_2$(dba)$_3$: palladium tri-dibenzylideneacetone of the formula $Pd_2[CO(C_6H_5C_2H_2)_2]_3$, Fe(TMSA): iron bis-bis-trimethyl-silylamide $Fe[N(Si(CH_3)_3)_2]_2$.

Example 1

In this example, platinum nanocrystals are prepared in accordance with the abovementioned protocol using 20 mg (0.03 mmol) of platinum organometallic precursor Pt(dba)$_2$ and, as PEG ligands, 18.1 mg (0.006 mmol) of monoAcPEG3000 and 9.1 mg (0.012 mmol) of mono-AmPEG750 dissolved in 20 ml of THF dehydrated and degassed beforehand.

FIGS. 1 to 4 are transmission electron microscopy views of colloidal solutions obtained respectively in THF, in water, in anisole and in toluene.

The nanocrystals obtained are in the form of elongated nanofilaments or nanorods, the average dimensions of which are the following: thickness of the order of 1 nm; length typically greater than 30 nm.

The x-ray analyses performed show that they are indeed non-oxidized platinum nanocrystals.

Figure 16:
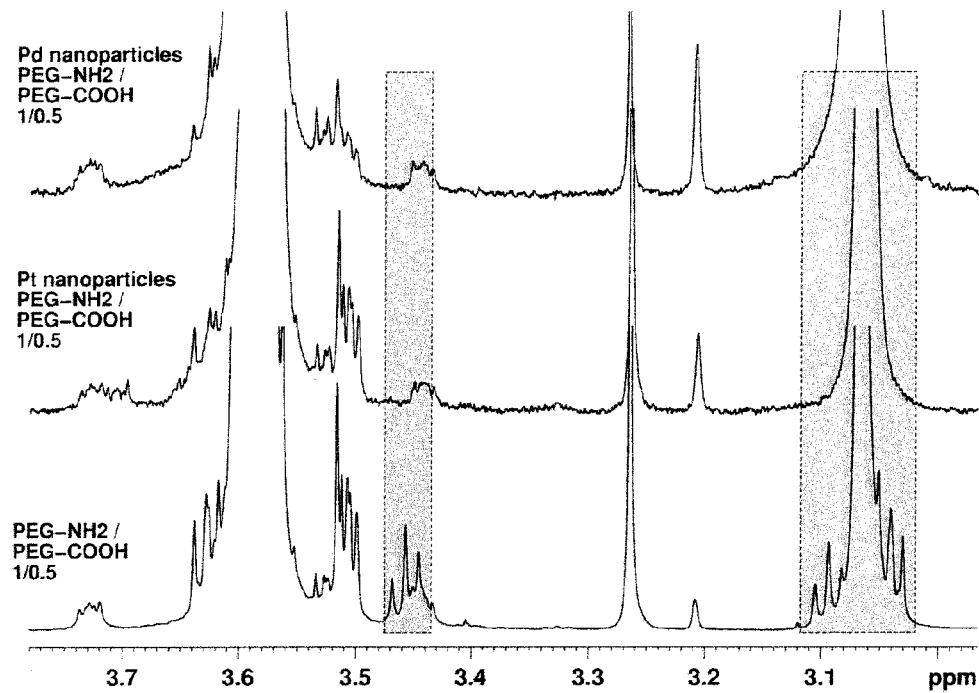
FIG. 16 is a NMR (nuclear magnetic resonance) spectrum.

FIG. 16 shows (middle curve) an NMR (nuclear magnetic resonance) spectrum obtained which is characteristic of the direct coordination of the ligand monoAmPEG750 via the amine coordination grouping with the surface of the platinum nanocrystals.

Example 2

In this example, ruthenium nanocrystals are prepared in accordance with the abovementioned protocol using 20 mg (0.06 mmol) of ruthenium organometallic precursor Ru(COD)(COT) and, as PEG ligands, 38 mg (0.012 mmol) of monoAcPEG3000 and 19 mg (0.024 mmol) of mono-AmPEG750 dissolved in 20 ml of THF dehydrated and degassed beforehand.

FIGS. 5 and 6 are transmission electron microscopy views of colloidal solutions obtained respectively in THF and in water. It was possible to obtain other colloidal solutions, in particular in anisole.

The nanocrystals obtained are in the form of entirely spherical (isotropic dimensions) nanoparticles, the average dimension of which is the following: 1.1±0.3 nm.

The x-ray analyses performed show that they are indeed non-oxidized ruthenium nanocrystals.

Example 3

In this example, ruthenium nanocrystals are prepared using 50 mg (0.146 mmol) of ruthenium organometallic precursor Ru(COD)(COT) and, as the PEG ligand, 120 mg (0.08 mmol) of bisAmPEG1500 dissolved in 50 ml of THF dehydrated and degassed beforehand. After the reaction, the nanocrystals are precipitated by 50 ml of pentane.

FIGS. 7 and 8 are transmission electron microscopy views of colloidal solutions obtained respectively in anisole and in water.

The nanocrystals obtained are in the form of entirely spherical (isotropic dimensions) nanoparticles, the average dimension of which is the following: 3.1±0.8 nm.

The x-ray analyses performed show that they are indeed non-oxidized ruthenium nanocrystals.

Example 4

In this example, ruthenium nanocrystals are prepared using 20 mg (0.06 mmol) of ruthenium organometallic precursor Ru(COD)(COT) and, as the PEG ligand, 47.5 mg (0.06 mmol) of monoAmPEG750 dissolved in 20 ml of THF dehydrated and degassed beforehand. After the reaction, the nanocrystals are precipitated by 30 ml of pentane.

Figure 9:
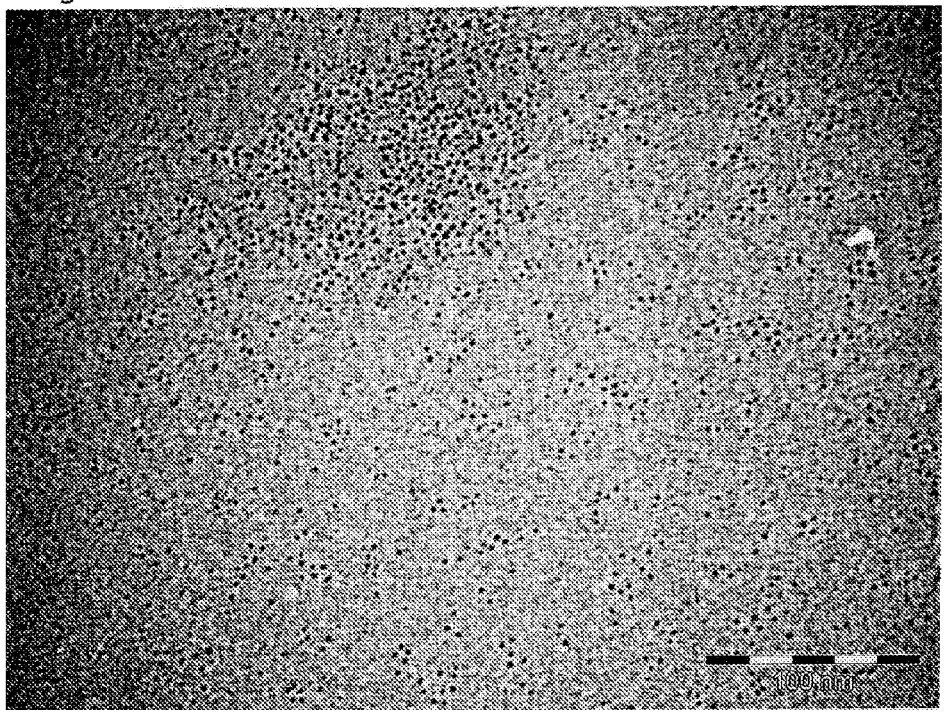
FIG. 9 is a transmission electron microscopy view of a colloidal solution obtained in THF.
Figure 10:
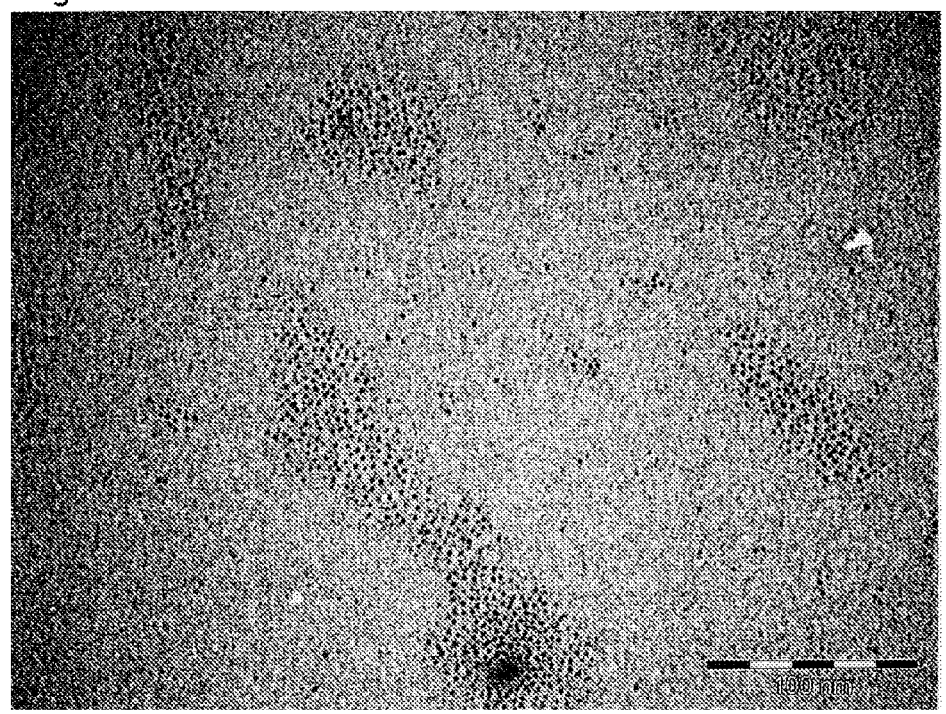
FIG. 10 is a transmission electron microscopy view of a colloidal solution obtained in water.

FIGS. 9 and 10 are transmission electron microscopy views of colloidal solutions obtained respectively in THF and in water. Other colloidal solutions were obtained, in particular in anisole and in toluene.

The nanocrystals obtained are in the form of entirely spherical (isotropic dimensions) nanoparticles, the average dimension of which is the following: 1.1±0.3 nm The x-ray analyses performed show that they are indeed non-oxidized ruthenium nanocrystals.

Figure 17:
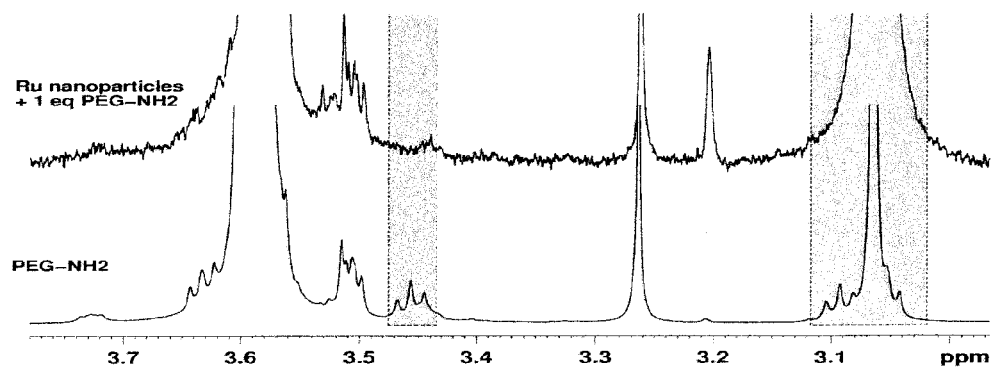
FIG. 17 is an NMR (nuclear magnetic resonance) spectrum.

FIG. 17 is an NMR (nuclear magnetic resonance) spectrum obtained which is characteristic of the direct coordination of the ligand monoAmPG750 via the amine coordination grouping with the surface of the ruthenium nanocrystals.

Example 5

In this example, palladium nanocrystals are prepared using 20 mg (0.022 mmol) of palladium organometallic precursor $Pd_2(dba)_3$ and, as PEG ligands, 52.4 mg (0.017 mmol) of monoAcPEG3000 and 26.2 mg (0.035 mmol) of monoAmPEG750 dissolved in 40 mL of THF dehydrated and degassed beforehand. After the reaction, a black solution is obtained, and the nanocrystals (white solid) are precipitated by 50 mL of pentane, washed with 3×30 mL of pentane and dried in vacuo.

Figure 11:
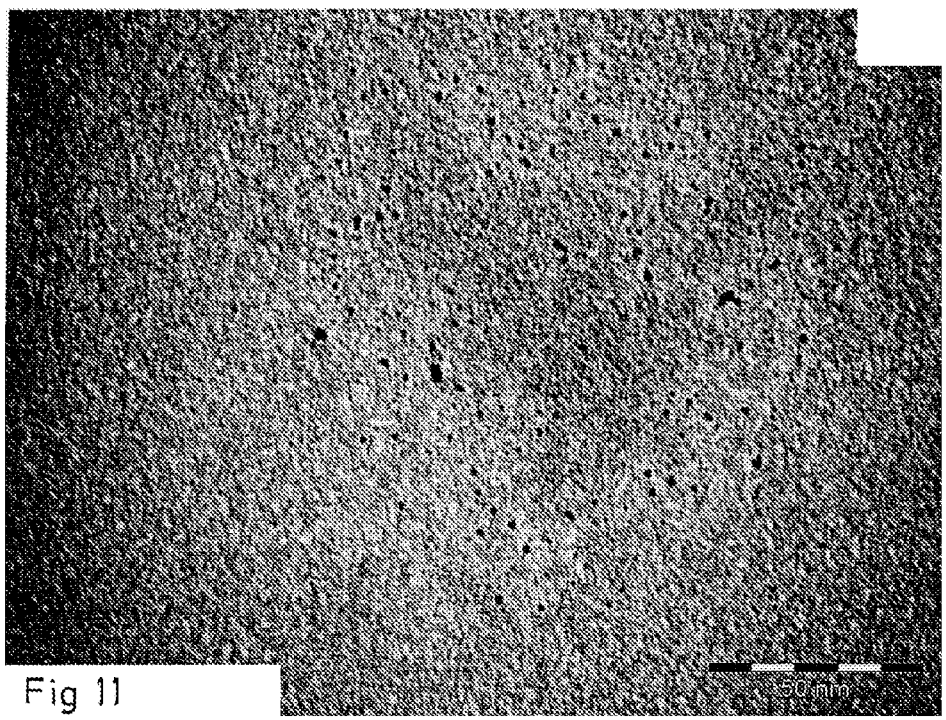
FIG. 11 is a transmission electron microscopy view of a colloidal solution obtained in THF.
Figure 12:
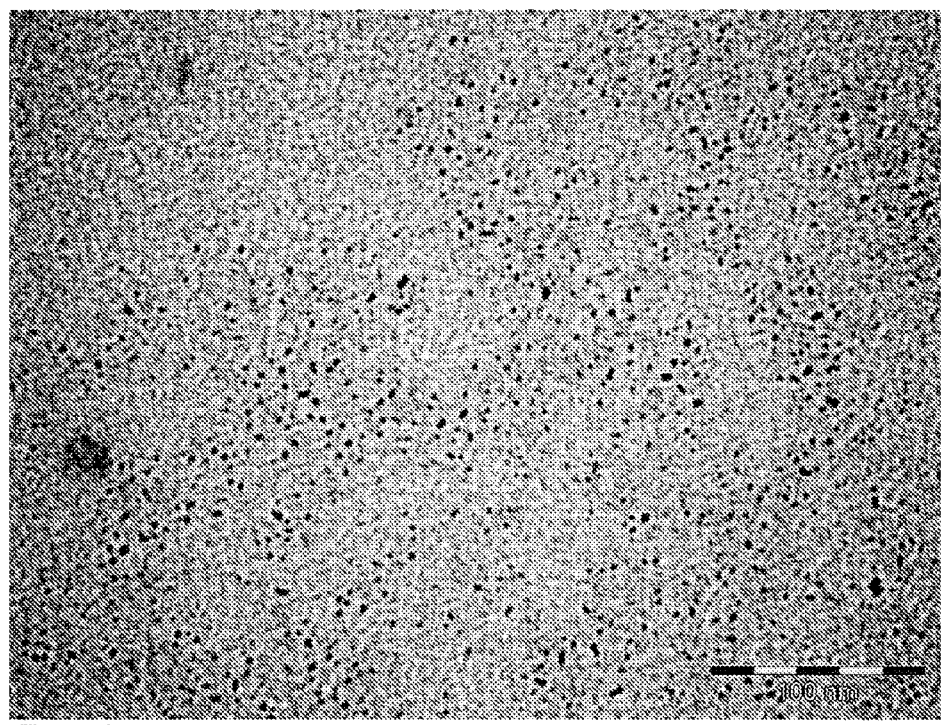
FIG. 12 is a transmission electron microscopy view of a colloidal solution obtained in water.

FIGS. 11 and 12 are transmission electron microscopy views of colloidal solutions obtained respectively in THF and in water. Other colloidal solutions were obtained, in particular in anisole and in toluene.

The nanocrystals obtained are in the form of entirely spherical (isotropic dimensions) nanoparticles, the average dimension of which is the following: 1.7±0.6 nm.

The x-ray analyses performed show that they are indeed non-oxidized palladium nanocrystals.

FIG. 16 shows (top curve) an NMR (nuclear magnetic resonance) spectrum obtained which is characteristic of the direct coordination of the ligand monoAmPG750 via the amine coordination grouping with the surface of the palladium nanocrystals.

Example 6

In this example, iron nanocrystals are prepared using 100 mg (0.26 mmol) of iron organometallic precursor Fe(TMSA) dissolved in 5 ml of mesitylene, dried and degassed beforehand, and, as PEG ligands, 199.1 mg (0.065 mmol) of monoAcPEG3000 and 99.6 mg (0.13 mmol) of monoAmPEG750 dissolved in 25 mL of mesitylene dehydrated and degassed beforehand. The reaction mixture is heated to 150° C. and kept at this temperature and under magnetic stirring for 48 hours. After the reaction, a black precipitate of nanocrystals is observed on the magnetic stirrer. The solution is filtered and the solid of white/brown color is dried.

Figure 13:
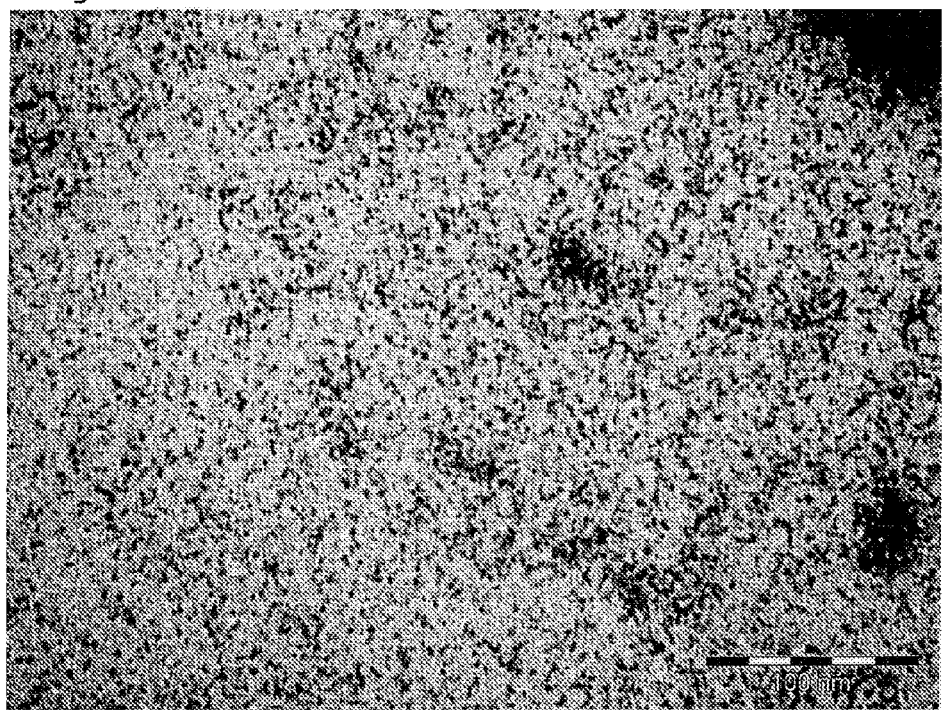
FIG. 13 is a transmission electron microscopy view of a colloidal solution obtained in THF.
Figure 14:
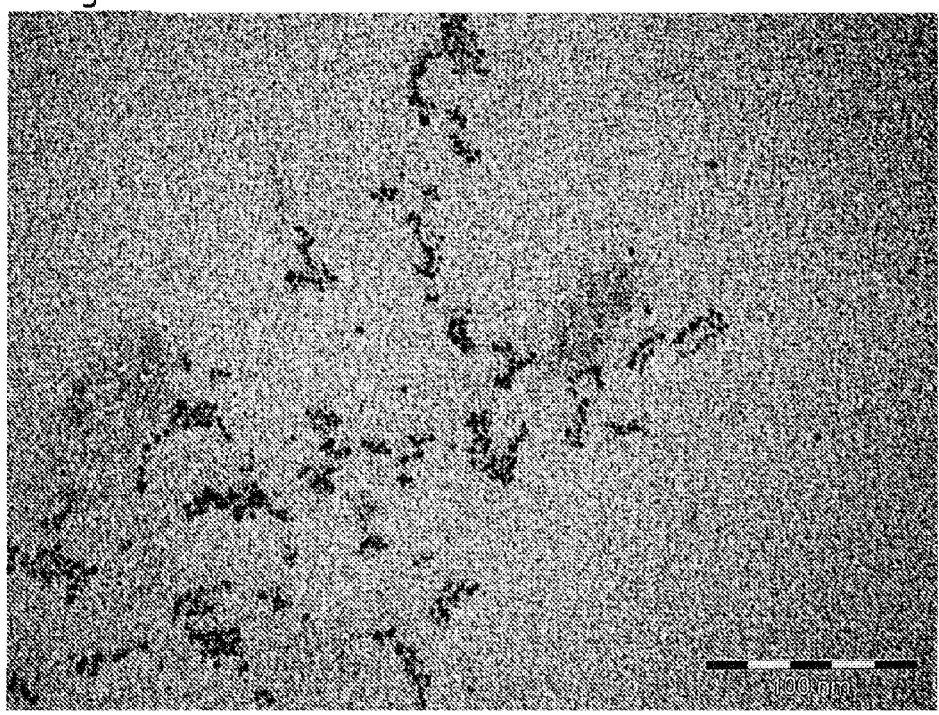
FIG. 14 is a transmission electron microscopy view of a colloidal solution obtained in water.

FIGS. 13 and 14 are transmission electron microscopy views of colloidal solutions obtained respectively in THF and in water. Other colloidal solutions were obtained, in particular in anisole and in toluene.

The nanocrystals obtained are in the form of entirely spherical (isotropic dimensions) nanoparticles, the average dimension of which is the following: 1.3±0.6 nm The x-ray analyses performed show that they are indeed non-oxidized iron nanocrystals and toluene.

Example 7

In this example, iron nanocrystals are prepared using 50 mg (0.13 mmol) of iron organometallic precursor Fe(TMSA) dissolved in 5 ml of mesitylene, dried and degassed beforehand, and, as the PEG ligand, 99.6 mg (0.13 mmol) of monoAmPEG750 dissolved in 15 mL of mesitylene dehydrated and degassed beforehand. The reaction mixture is heated to 150° C. and kept at this temperature and under magnetic stirring for 48 hours. After the reaction, a black solution is obtained, and the nanocrystals (black solid) are precipitated by 50 ml of pentane and then washed with (3×30 ml of pentane) and dried in vacuo.

Figure 15:
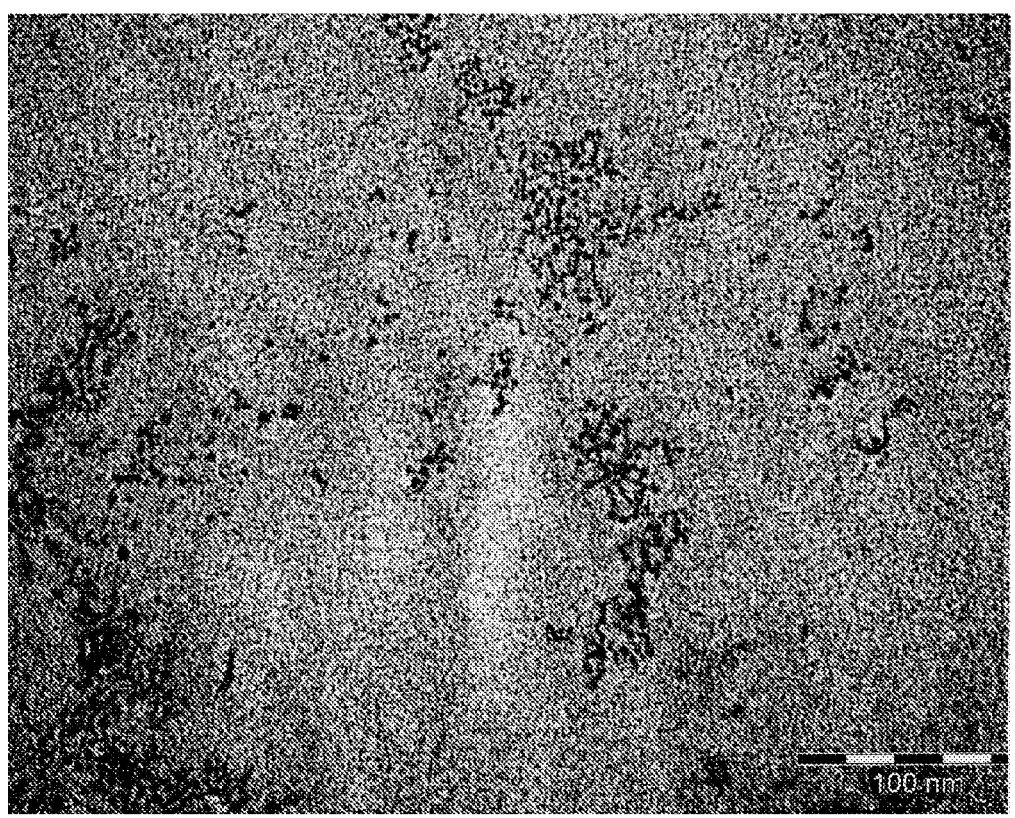
FIG. 15 is a transmission electron microscopy view of a colloidal solution obtained in water.

FIG. 15 is a transmission electron microscopy view of a colloidal solution obtained in water. Other colloidal solutions were obtained, in particular in anisole and in toluene.

The nanocrystals obtained are in the form of entirely spherical (isotropic dimensions) nanoparticles, the average dimension of which is the following: 1.4±0.4 nm The x-ray analyses performed show that they are indeed non-oxidized iron nanocrystals.

The invention claimed is:

1. A method for preparing a composition of metal nanocrystals from at least one organometallic precursor, comprising:

preparing a liquid solution of at least one organometallic precursor in a solvent medium in the presence of at least one PEG ligand, wherein said PEG ligand has at least one carbon chain, at least one end of which is functionalized by a coordination group comprising at least one hetero atom, and is soluble in said solvent medium; and allowing at least one reducing agent with regard to each organometallic precursor to act on said liquid solution under reaction conditions suitable for direct formation of metal nanocrystals, wherein:

said at least one PEG ligand is selected from the group of organic ligands that are soluble in water and include at least one carbon chain comprising at least one polyoxyethylene group $[—OCH_2CH_2]_n$, n being an integer greater than 1, at least one end of the ligand is functionalized by a coordination group selected from the group consisting of a primary amine —$R^3NH_2$; a carboxyl group —$R^4COOH$; a thiol group —$R^5SH$; a phosphine group —$R^6P(Ph)_2$, Ph representing phenyl; and a phosphonate group chosen from —$PO(OR^7)(OR^8)$, —$PO(O^-)_2$ and —$PO(O^-)(OH)$;

$R^3$, $R^4$, $R^5$, and $R^6$ each independently represent at least one aliphatic chain;

R[7] and R[8] each independently are a hydrogen atom or a group comprising at least one aliphatic chain; and each PEG ligand is soluble in the solvent medium, and wherein a water-compatible and organic-compatible composition of metal nanocrystals is obtained directly in one stage.

2. The method of claim 1, wherein the at least one PEG ligand corresponds to the general formula (I):

wherein:

R[1] is selected from the group consisting of a primary amine group —R[3]NH$_2$; a carboxyl group —R[4]COOH; a thiol group —R[5]SH; a phosphine group —R[6]P(Ph)$_2$, Ph representing phenyl; and a phosphonate group chosen from —PO(OR[7])(OR[8]), —PO(O[−])$_2$ and —PO(O[−]) (OH);

R[3], R[4], R[5], and R[6] of R[1] each independently represent at least one aliphatic chain;

R[7] and R[8] of R[1] each independently represent a hydrogen atom or a group comprising at least one aliphatic chain;

R[2] is selected from the group consisting of a hydrogen atom; an alkyl group; an unbranched fatty chain; a primary amine group —R[3]NH$_2$; a carboxyl group —R[4]COOH; a thiol group —R[5]SH; a phosphine group —R[6]P(Ph)$_2$, Ph representing phenyl; and a phosphonate group chosen from —PO(OR[7])(OR[8]), —PO(O[−])$_2$ and —PO(O[−]) (OH);

R[3], R[4], R[5], R[6] of R[2] each independently represent at least one aliphatic chain;

R[7] and R[8] of R[2] each independently represent a hydrogen atom or at least one aliphatic chain, and n is an integer greater than 1.

3. The method of claim 1, wherein each PEG ligand has an average molecular weight of between 300 g/mol and 20,000 g/mol.

4. The method of claim 1, wherein the at least one PEG ligand, is an amino/carboxy-PEG ligand chosen from the group of amines and carboxylic acids that include at least one carbon chain having at least one [OCH$_2$CH$_2$], n group, n being an integer greater than 1, and wherein said amino/carboxy-PEG ligand is soluble in water.

5. The method of claim 4, wherein the at least one amino/carboxy-PEG ligand is selected from the group consisting of αamino-poly(ethylene glycol), bis-amino-poly(ethylene glycol), αcarboxy-poly(ethylene glycol), bis-carboxy-poly(ethylene glycol), and αamino-ω-carboxy-poly (ethylene glycol).

6. The method of claim 4, wherein the at least one amino/carboxy-PEG ligand is selected from the group consisting of bis(3-propylamine)-poly(ethylene glycol) of the formula H$_2$NC$_3$H$_6$[OCH$_2$CH$_2$]$_n$OC$_3$H$_6$NH$_2$, having a molecular weight of the order of 1,500 g/mol, α-(2-ethylamine)-methoxy(ethylene glycol) of the formula H$_3$C[OCH$_2$CH$_2$]$_n$OC$_2$H$_4$NH$_2$, having a molecular weight of the order of 750 g/mol, and poly(ethylene glycol) methyl ether-carboxylic acid of the formula H$_3$C[OCH$_2$CH$_2$]$_n$O—CH$_2$—COOH, having a molecular weight of the order of 3,000 g/mol.

7. The method of claim 1, wherein said solvent medium comprises at least one of tetrahydrofuran (THF), toluene, anisole, and mesitylene.

8. The method of claim 1, wherein the production of the metal nanocrystals is carried out at a temperature of between 0° C. and 300° C.

9. The method of claim 1, wherein each organometallic precursor, the solvent medium and each ligand are chosen such that a water-compatible composition of metal nanocrystals comprising at least one metal in the crystalline state selected from the group consisting of gold, silver, platinum, rhodium, iron, cobalt, copper, nickel, zinc, tin, titanium, manganese, chromium, vanadium, indium, ruthenium, palladium, molybdenum, niobium, zirconium, tantalum, aluminum, gallium, tungsten, rhenium, osmium, and iridium is obtained.

10. The method of claim 1, wherein each organometallic precursor, the solvent medium and each ligand are chosen such that a water-compatible composition of metal nanocrystals having at least one dimension of between 1 nm and 5 nm is obtained.

11. The method of claim 1, wherein the at least one reducing agent is at least one of dihydrogen and carbon monoxide.

12. A composition of metal nanocrystals, comprising at least one PEG ligand chosen from the group of organic compounds that are soluble in water and include at least one carbon chain comprising at least one polyoxyethylene group 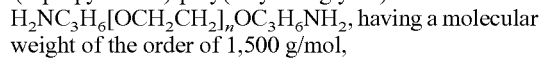, n being an integer greater than 1, wherein at least one end of the ligand is functionalized by a coordination group selected from the group consisting of a primary amine —R[3]NH$_2$; a carboxyl group —R[4]COOH; a thiol group —R[5]SH; a phosphine group —R[6]P(Ph)$_2$, Ph representing phenyl; and a phosphonate group chosen from —PO(OR[7])(OR[8]), —PO(O[−])$_2$ and —PO(O[−])(OH);

R[3], R[4], R[5], and R[6] each independently represent at least one aliphatic chain;

R[7] and R[8] each independently are a hydrogen atom or a group comprising at least one aliphatic chain; and wherein the composition of metal nanocrystals is water-compatible and organic-compatible.

13. The composition of claim 12, wherein the composition is in a form of an aqueous colloidal solution.

14. The composition of claim 12, wherein the metal nanocrystals comprise at least one metal in the crystalline state selected from the group consisting of gold, silver, platinum, rhodium, iron, cobalt, copper, nickel, zinc, tin, titanium, manganese, chromium, vanadium, indium, ruthenium, palladium, molybdenum, niobium, zirconium, tantalum, aluminum, gallium, tungsten, rhenium, osmium, and iridium.

15. The composition of claim 12, wherein the metal nanocrystals have at least one dimension of between 1 nm and 5 nm.

16. The composition of claim 12, wherein the metal nanocrystals comprise at least one oxidizable metal and are at least partially oxidized.

17. The method of claim 1, wherein each PEG ligand has an average molecular weight of between 750 g/mol and 3,000 g/mol.

18. The method of claim 1, wherein the production of the metal nanocrystals is carried out at ambient temperature.

* * * * *